US 12,226,862 B2

(12) United States Patent
Kelly et al.

(10) Patent No.: US 12,226,862 B2
(45) Date of Patent: Feb. 18, 2025

(54) SPRING COMPRESSION TOOL

(71) Applicant: Leidos Industrial Engineers Limited, Wickford (GB)

(72) Inventors: Paul Edwin Kelly, Rochford (GB); Jonathan Stone, Goldhanger (GB)

(73) Assignee: Leidos Industrial Engineers Limited, Wickford (GB)

( * ) Notice: Subject to any disclaimer, the term of this patent is extended or adjusted under 35 U.S.C. 154(b) by 0 days.

(21) Appl. No.: 18/235,080

(22) Filed: Aug. 17, 2023

(65) Prior Publication Data

US 2024/0051074 A1 Feb. 15, 2024

Related U.S. Application Data

(63) Continuation of application No. PCT/IB2022/000646, filed on Oct. 28, 2022.

(60) Provisional application No. 63/396,472, filed on Aug. 9, 2022.

(51) Int. Cl.
*B23P 19/04* (2006.01)
*B62D 65/12* (2006.01)

(52) U.S. Cl.
CPC .......... *B23P 19/048* (2013.01); *B62D 65/12* (2013.01); *B23P 2700/14* (2013.01)

(58) Field of Classification Search
CPC ..... B23P 19/048; B23P 2700/14; B62D 65/12
See application file for complete search history.

(56) References Cited

U.S. PATENT DOCUMENTS 2,757,448 A * 8/1956 Brown .................. B23P 19/048
29/225
5,050,281 A * 9/1991 Yamashina ........... B23P 19/048
29/227

FOREIGN PATENT DOCUMENTS

| CN | 111284983 A | * | 6/2020 |
| DE | 102008010394 A1 | | 8/2009 |
| FR | 3040648 A1 | | 3/2017 |
| WO | 2007/100326 A1 | | 9/2007 |

OTHER PUBLICATIONS

English Machine Translation of CN_111284983_A (Year: 2020).*
International Search Report and Written Opinion for Application No. PCT/IB2022/000646, dated May 16, 2023, 11 pages.

* cited by examiner

*Primary Examiner* — Sarang Afzali
(74) *Attorney, Agent, or Firm* — McCarter & English, LLP; David R. Burns

(57) ABSTRACT

The present disclosure describes an adaptive spring compression tool that streamlines and partially automates the joining of a vehicle suspension system with a vehicle body on an assembly line. The spring compression tool can be modified and programmed to accommodate various vehicle models, products, and design modifications without replacing the entire tooling system. Additionally, the spring compression tool of the present disclosure has a structure, a function, and an operation that facilitates the compression of a spring without exerting large forces on the vehicle body. In various embodiments, the spring compression tool comprises at least two independent drives that adjust the compression of a spring and the position of a suspension system to achieve a car line position with the vehicle body.

18 Claims, 10 Drawing Sheets

SPRING COMPRESSION TOOL

RELATED APPLICATION

The present application is a continuation of PCT/IB2022/000646, filed Oct. 28, 2022, which claims priority to U.S. Provisional Patent Application No. 63/396,472, filed Aug. 9, 2022, the entire contents of each of which are herewith incorporated by reference into the present application in their entirety.

BACKGROUND

In the manufacture of automobiles, the body of a vehicle and the suspension system are separately assembled. Commonly, the suspension system, which often includes axles and springs, is assembled on an assembly line. Once its assembly is complete, the vehicle body and the suspension system are mated to one another. A tooling system is used to align the suspension system, compress the springs, and connect the suspension system to the vehicle body.

Conventional tooling systems generally use a series of components that are fixed to a base plate to align the suspension with the vehicle body. Technical challenges arise when new vehicle models or modifications to existing products are introduced which render the existing tool system obsolete. This is because the new designs often require new dimensions and configurations of the base plate and tool components that accommodate changes in the design. Further, conventional tooling systems in manufacturing situations where a suspension spring, which may also be known as an axle spring, of a suspension system reacts directly on a car body, present a technical challenge. In situations where the structure and strength of the vehicle body is not sufficient to facilitate a simple spring compression, a specialized tool is required that is tailored to the given spring designs for any given vehicle.

SUMMARY

The present disclosure describes an adaptive spring compression tool that can be modified and programmed to accommodate various vehicle models, products, and design modifications without replacing the entire tool system. Additionally, the spring compression tool of the present disclosure describes a specialized tool that facilitates the compression of a spring without exerting large forces on the vehicle body.

The present disclosure is directed to a spring compression tool used to marry a first assembly to a second assembly via a spring. The spring compression tool may include a frame; a spring clamping unit attached to the frame, the spring clamping unit having a clamp with a clamp head; a moveable frame moveably connected to the frame; one or more supports mounted on the moveable frame and configured to hold the first assembly; and one or more control systems that adjust a height of a spring held within the spring clamping unit in real-time fashion to achieve a desired spring height.

In some embodiments, the one or more control systems achieve a level marriage of the first assembly and the second assembly in a desired spatial position in real-time. In some embodiments, the moveable frame is moveable in horizontal and vertical directions. In some embodiments, the moveable frame is moveable in a vertical direction. In some embodiments, the spring clamping unit is moveable and mounted to the frame via a linear rail of the frame. In some embodiments, the moveable frame additionally includes a plurality of adjustable location pins mounted to a surface of the frame. In some embodiments, the one or more control systems further includes a drive motor, one or more processors, and one or more encoders. In some embodiments, the one or more control systems includes a primary drive unit controlling a vertical position of the moveable frame. In some embodiments, the spring clamping unit includes a plurality of clamps.

In some embodiments, the one or more control systems include a secondary drive mechanism controlling the spatial position of the clamp head. In some embodiments, the secondary drive manipulates the clamp head into an open or closed position. In some embodiments, the secondary drive mechanism secures the clamp head to an upper region of a spring.

In some embodiments, the supports are adjustable in vertical and horizontal directions to adjust the spatial position of the upper region of the spring and to compress the spring. In some embodiments, the spring compression tool further includes a safety system having a safety switch and a spatial verification system. In some embodiments, the clamp head is an interchangeable clamp head that can accommodate different spring varieties and sizes. In some embodiments, the spring clamping unit additionally includes a first set of linear rails and blocks attached to the frame and supporting the spring clamping unit and the first set of linear rails and blocks are configure to permit adjustment of the position of the spring clamping unit on the frame. In some embodiments, the spring clamping unit additionally includes a second set of linear rails and blocks allowing adjustment of the height of the camp head and clamp. In some embodiments, the first assembly is a suspension system and the second assembly is a portion of a vehicle body. In some embodiments, the one or more supports are adjustable to conform to the first assembly.

The present disclosures is directed to a method for marrying a suspension system to a vehicle body via a spring compression tool. The method may include loading the suspension system including a suspension spring onto one or more supports of a moveable frame of the spring compression tool. The method may include adjusting a clamp head of the spring clamping unit of the spring compression tool to hold a portion of the compression spring. The method may include adjusting a height of the moveable frame to adjust a position of the suspension system relative to an underside of a vehicle body and to compress the suspension spring. The method may include marrying the suspension system to the vehicle body. The method may include adjusting the one or more supports of the spring compression tool to accommodate the suspension system.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the spring compression tool, reference is made to the accompanying figures, wherein.

DETAILED DESCRIPTION

Figure 1:
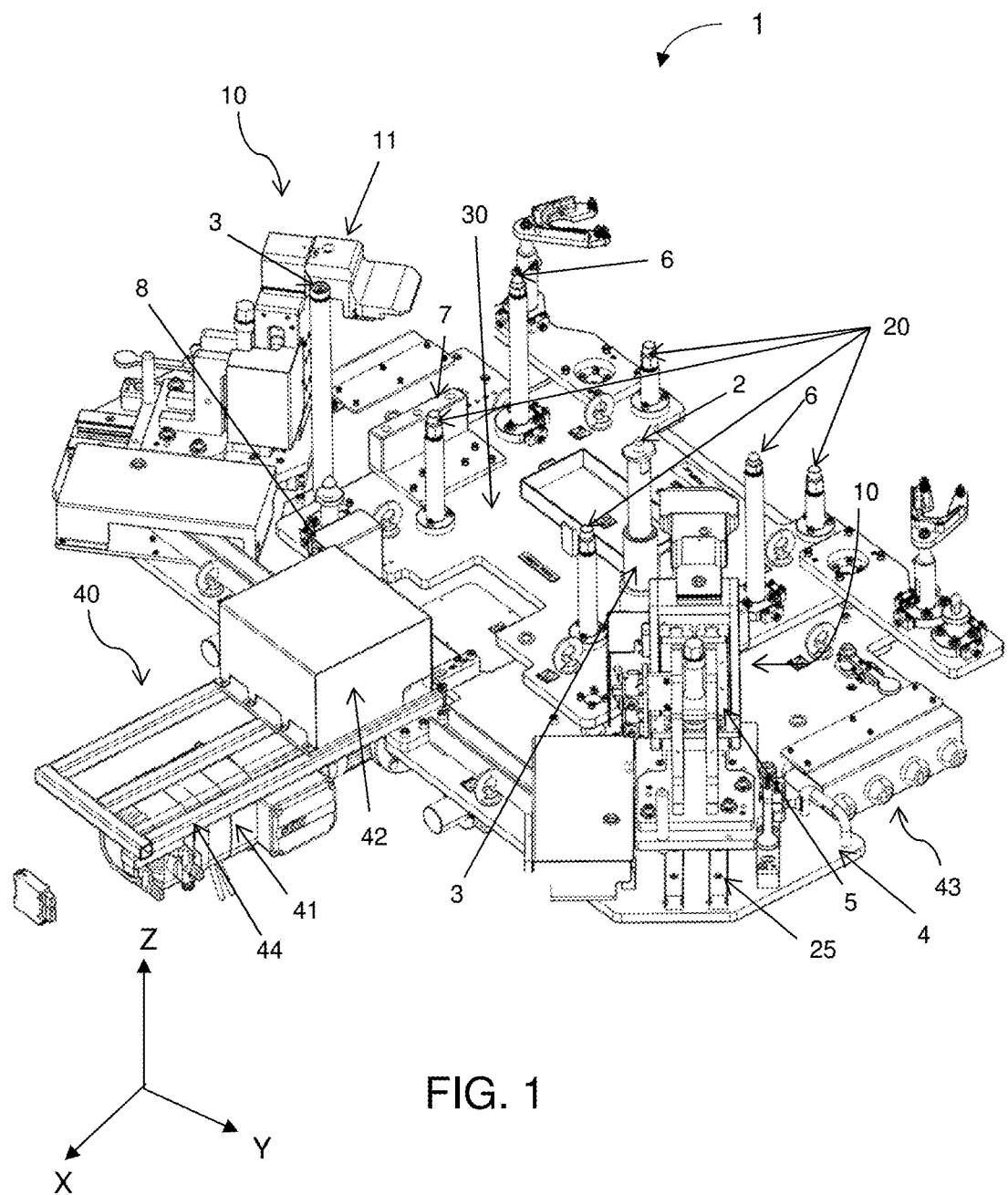
FIG. 1 is a top, isometric view of an exemplary spring compression tool in accordance with embodiments of the present disclosure.

Exemplary embodiments of the present disclosure provide an adaptive spring compression tool. Such a tool can be used by a vehicle manufacturer to combine one or more vehicle sub-assemblies, for example, a first assembly comprising a suspension system and a second assembly comprising a vehicle body. In various embodiments, the spring compression tool is used to marry a first assembly to a second assembly via a spring.

While exemplary embodiments of a spring compression tool are described, one of ordinary skill in the art will recognize that exemplary embodiments are not limited to the illustrative embodiments and that exemplary spring compression tool may be used to aid in manufacturing of various products during various stages of their manufacture. In addition, components of the exemplary spring compression tool and methods of using said tool are not limited to the illustrative embodiments described below.

Example embodiments of the present disclosures provide a spring compression tool used to marry a first assembly to a second assembly via a spring. In some embodiments, the spring compression tool includes: a frame; a spring clamping unit attached to the frame, the spring clamping unit having a clamp with a clamp head; a moveable frame moveably connected to the frame; one or more supports mounted on the moveable frame and configured to hold the first assembly; and one or more control systems that adjust a height of a spring held within the spring clamping unit in real-time fashion to achieve a desired spring height. In some embodiments, the one or more control systems achieve a level marriage of the first assembly and the second assembly in a desired spatial position in real-time.

Example embodiments of the present disclosure provide an adaptive spring compression tool. Such a tool can be used by a vehicle manufacture to combine one or more vehicle sub-assemblies, for example, a first assembly comprising a suspension system and a second assembly comprising a vehicle body. The spring compression tool is used to marry a first assembly to a second assembly, often via a spring. In certain embodiments, the spring compression tool comprises a frame and a spring clamping unit attached to the frame. In embodiments, the spring clamping unit has a clamp with a clamp head. The spring clamping unit can comprise a plurality of clamps. In various embodiments, the spring compression tool comprises an interchangeable clamp head that can be changed to accommodate different models, products, and design modifications without replacing the entire spring clamping unit or spring compression tool.

Embodiments of the adaptive spring compression tool may be used in manufacturing situations where a suspension spring of a suspension system reacts directly on a car body, to compress the suspension spring by varying amounts in order to facilitate the assembly of the axle to the body. This solves the technical challenge of installing of a suspension spring of a suspension system that reacts directly on a car body. The adaptive spring compression tool can receive the force necessary to compress the compression spring so that the force is not directed to portions of the vehicle body that may lack sufficient structure to facilitate a simple spring compression. In some embodiments, the adaptive spring compression tool may provide for the installation of one suspension spring via a single spring clamping unit, or of a plurality of suspension springs via a plurality of spring clamping units (e.g., two or four spring clamping units to support two or four suspension springs) in a simultaneous, near simultaneous, or sequential manner.

The spring compression tool further comprises supports configured to hold the first assembly, for example, a suspension system. In various embodiments, the suspension system is connected or placed on a moveable frame of the spring compression tool. In certain embodiments, the moveable frame, and thus the suspension system, is movable in horizontal and vertical directions.

To facilitate movement of various elements of the spring compression tool, in an exemplary embodiment, the spring compression tool comprises one or more control systems. For example, one control system can adjust the moveable frame, and thus the position of the first assembly, relative to a number of elements, such as the spring compression tool, the assembly line, the vehicle body, and the manufacturing facility. In various embodiments, one control system can secure the spring clamping unit to the spring. In various embodiments, the same or a separate control system can manipulate the spatial position of the spring and compress the spring, readying it for assembly to the vehicle body.

In various embodiments, the one or more control systems adjusts the height of the spring in real-time fashion, e.g., permitting adjustment by the spring assembly tool during the assembly process. For example, the one or more control systems adjust the height of the spring from a starting, parked position, ("position 0") to an assembly position, ("position 1"). In some embodiments, the spring compression tool may adjust the height of the suspension spring and the first assembly to align the suspension spring, the first assembly, and the second assembly corresponding to the alignment in the assembled vehicle. The position in which the suspension spring, the first assembly, and the second assembly are aligned in a desired spatial position corresponding to the configuration of the parts in the assembled vehicle may be referred to as a level marriage. In a level marriage, the moveable frame with the sub frame and the suspension spring are positioned parallel with the vehicle body such that when the sub frame and vehicle body are bought together, the sub frame is aligned with respect to the vehicle body such that the components of each may be secured together into the configuration present in the assembled vehicle. In various embodiments, this action achieves a level marriage of the first assembly and the second assembly in a desired spatial position. For example, the alignment of the first assembly and the second assembly may be an alignment of each in a car line position.

Figure 8A:
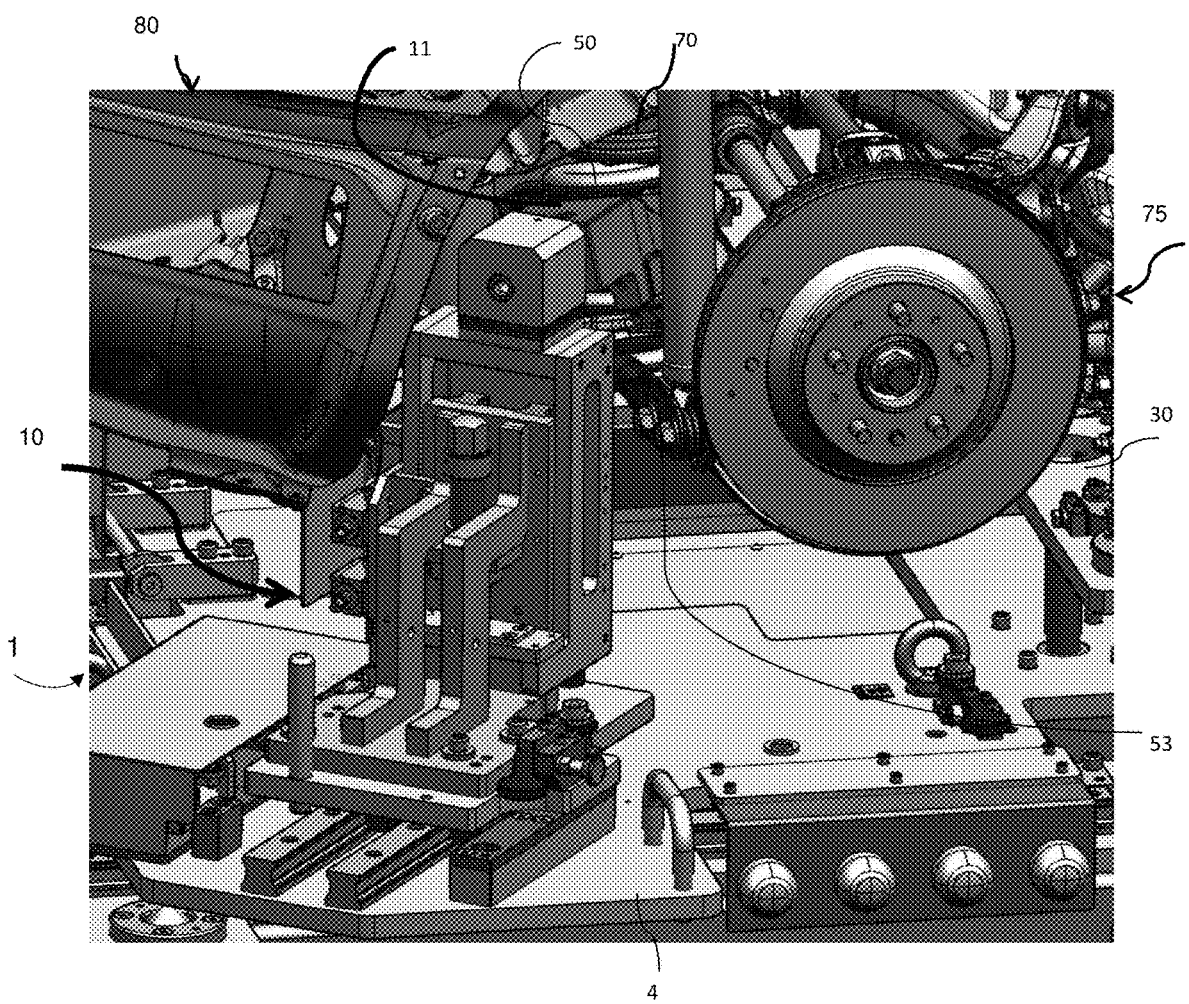
FIG. 8A is a side perspective view of a portion of an exemplary spring compression tool including one spring clamping unit and portions of a vehicle sub frame and a vehicle body in car line position.
Figure 8B:
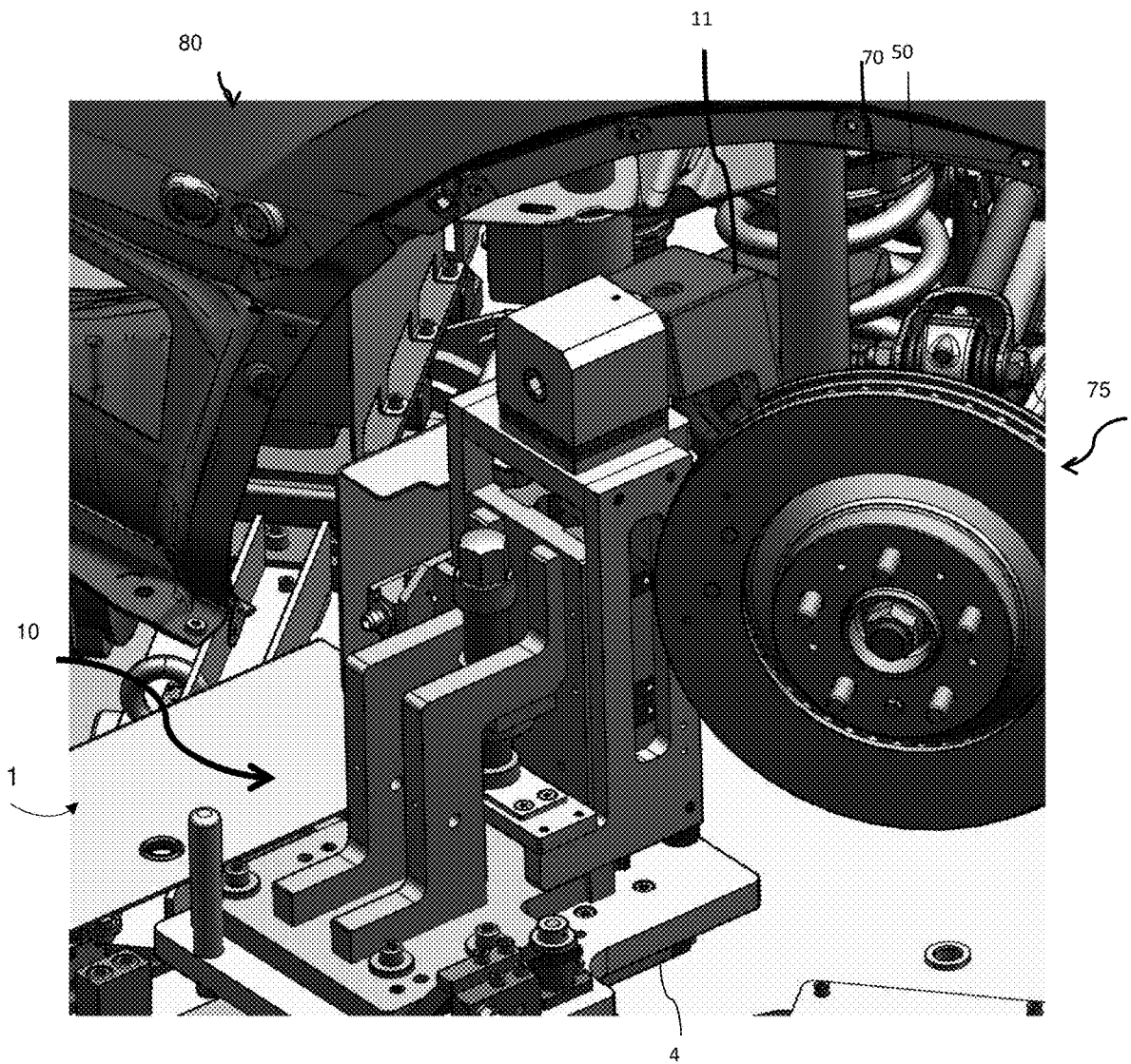
FIG. 8B is a side perspective view of a portion of an exemplary spring compression tool including one spring clamping unit and portions of a vehicle sub frame and a vehicle body in car line position.
Figure 8C:
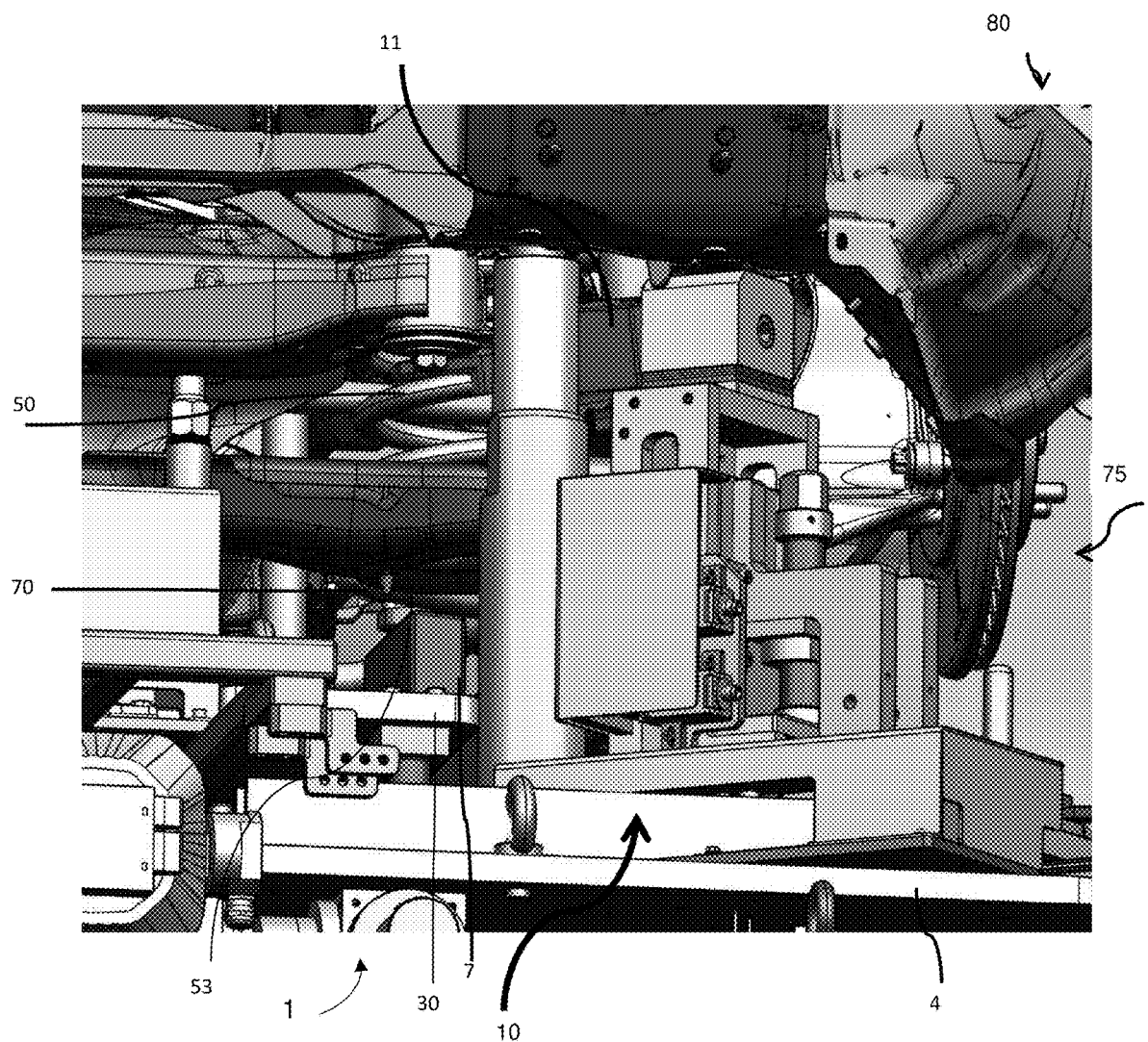
FIG. 8C is a side perspective view of a portion of an exemplary spring compression tool including one spring clamping unit and portions of a vehicle sub frame and a vehicle body in car line position.

The car line position, as used herein, refers to the position in which each component of the vehicle being assembled in that portion of the assembly process is positioned at or near the position of that component in the assembled vehicle. In some embodiments, to achieve the car line position, the spring compression tool provides control of the height of the compression spring in real time in order to permit installation of the compression spring (e.g., a single compression spring, two rear compression springs, two front compression springs, or four compression springs). It may be appreciated that, although a desired alignment or car line position may correspond to the alignment in the finished vehicle, there may be further steps, such as tightening fasteners that result in some variation between the desired or car line position of a given sub assembly and the position of the sub assembly in the assembled vehicle. FIGS. 8A-8C, described below, illustrate an example of a vehicle sub frame 75 and vehicle body 80 in car line position.

In accordance with various exemplary embodiments, the one or more control systems further comprises several components. For example, the one or more control systems includes a drive motor, one or more processors, and one or more encoders. In various embodiments, the one or more control systems comprises a primary drive mechanism controlling the position of the moveable frame. In various embodiments, the one or more control systems can further comprise a secondary drive mechanism controlling the compression and spatial position of the spring clamp head and suspension spring. To prepare the spring clamping unit for attachment with the spring, the secondary drive is capable of manipulating the clamp head into an open or closed position. In the open clamp head position, the clamp head may pass between coils of a spring with a clearance gap between the clamp head and the spring. In the closed open claim head position, the clamp head is lowered onto a surface of one of the coils of the spring. Next, the secondary drive secures the clamp head to an upper region of the spring.

In accordance with various exemplary embodiments, the supports of the spring compression tool are attached to a movable frame, capable of moving in various directions. For example, the supports may be movable in vertical and horizontal directions to adjust the spatial position of the first assembly. Within vehicle manufacturing lines, large forces are present during the maneuvering and assembly of vehicle components. This is especially true when connecting two large vehicle sub-assemblies, such as the suspension system and the vehicle body. The force necessary for compressing the spring during assembly of the suspension system onto the body of the vehicle is about ten kilo-Newtons. Therefore, to ensure worker safety and to reduce product damage, the spring compression tool may further include a safety system having a safety switch and spatial verification. In some embodiments, the spring compression tool includes an interchangeable clamp head that can accommodate different spring varieties and sizes.

The disclosure is also directed to a method for marrying a suspension system to a vehicle body via a spring. In embodiments, the method includes loading the suspension system including a suspension spring onto one or more supports of a moveable frame of the spring compression tool. The method may further include adjusting a clamp head of the spring clamping unit of the spring compression tool to hold a portion of the compression spring. The method may further include adjusting a height of the moveable frame to adjust a position of the suspension system and to compress the suspension spring. The method may further include marrying the suspension system to the vehicle body. The method may further include adjusting the one or more supports of the spring compression tool to accommodate the suspension system.

Figure 2:
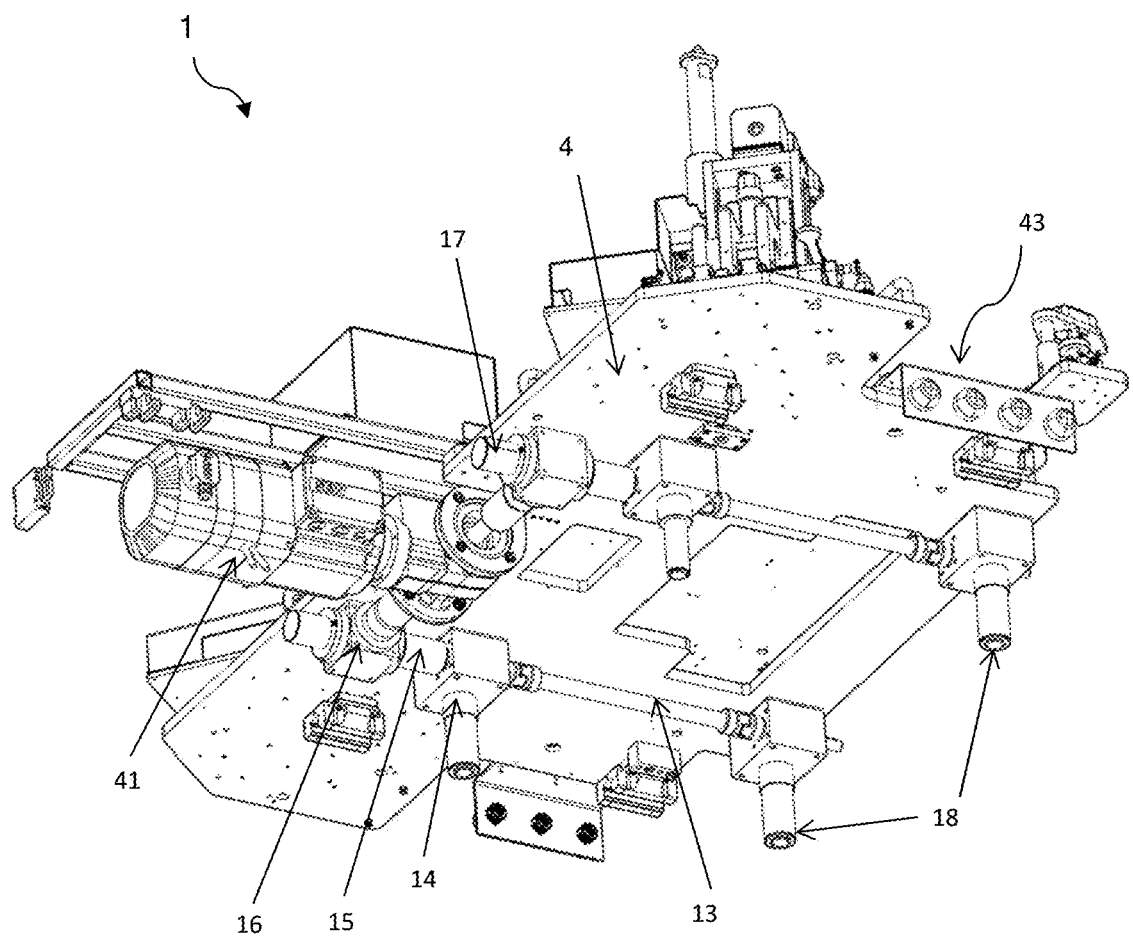
FIG. 2 is a bottom, isometric view of an exemplary spring compression tool in accordance with embodiments of the present disclosure.

FIGS. 1 and 2 illustrate an exemplary spring compression tool 1 suitable for facilitating the assembly of a suspension system and a vehicle body. FIGS. 1 and 2 provide top and bottom isometric views, respectively, of spring compression tool 1 in accordance with embodiments of the present disclosure. The spring compression tool 1 facilitates the compression of a spring without exerting large forces on the vehicle body. In various embodiments, the spring compression tool 1 is configured to bring a spring of a front or rear suspension system of a vehicle into an at least partially compressed state, in particular when the suspension system is assembled onto a vehicle body. In various embodiments, the spring compression tool 1 provides enhanced customization and control during the manufacturing process, for example, controlling the position of the top of the springs, automating the compression of the front and rear springs, and achieving an ideal car line position of the suspension system such that all of the components contact the underside of the vehicle body simultaneously or near simultaneously. The car line position, as described above, refers to the position in which the components of the vehicle are positioned where the vehicle will be assembled in a position corresponding to that of the components in the assembled vehicle.

In an automobile assembly line, the body of an automobile is generally conveyed in a lifted state (e.g., while being hung from an overhead system). Vehicle components, like the suspension, are attached to the underside of the body and assembled from beneath. In other words, the suspension system, for example, is assembled onto the body of the automobile by moving it in a vertical direction from below towards the body. In the present disclosure, the body may alternatively be moved in a vertical direction from above towards the suspension system, and/or both the body and the suspension system may be moved in a vertical direction towards each other.

Referring to FIG. 1, the spring compression tool 1 is displayed in an isometric view with arrows X, Y, and Z indicating the three-dimensional, directional axes of the figure. In various embodiments, the Z axis indicates an up-down, vertical direction with respect to the vehicle production line and is referred to as an assembly direction. In various embodiments, in the assembly direction, the suspension system, which may include the front or rear axle, is moved towards the vehicle body. In the context of the present disclosure the "assembly direction" is to be understood as a direction in which the front or rear suspension system and the body of the automobile or vehicle approach one another during assembly. Accordingly, the Z-direction or "assembly direction" of the spring compression tool 1 corresponds to an approximately vertical direction.

In various embodiments, the exemplary spring compression tool 1 comprises a frame 4 and a moveable frame 30 that is moveably connected to the frame 4. Alternatively, the moveable frame 30 may be referred to as the Z-direction lifting plate. As such, in exemplary embodiments, the moveable frame 30 is moveable in the Z-direction with respect to a frame 4. In various embodiments, the spring compression tool 1 comprises supports 20 that are attached to the moveable frame 30. The supports 20 are configured to support a first assembly, such as a suspension system, or subcomponents thereof, such as an axle.

In the present disclosure, during the vehicle assembly process, the spring compression tool 1 can be located in various locations. For example, the spring compression tool 1 can be located in a starting position, ("position 0"). In various embodiments, position 0 is the location at which the first assembly, for example a vehicle suspension system, is placed and secured onto the spring compression tool. Position 0 can be referred to as the starting position, original home position, and parked position. In various embodiments, position 0 is when the spring compression tool 1 is at its lowest height.

In another example, a spring compression tool as taught herein can be located in a car line position, ("position 1"). In various embodiments, position 1 is the location at which the first assembly is lifted to its maximum height used within a particular improved vehicle manufacturing procedure as described herein. Position 1 can be referred to as the ideal assembly position, marriage station, appropriate height, or car line position relative to the second assembly, such as the vehicle body. Positions 0 and 1 can include lateral and vertical components. These positions can be defined relative to various elements. For example, these positions can be defined relative the first assembly, the second assembly, the assembly line, or the manufacturing facility, among others.

In various embodiments, spring compression tool 1 further comprises one or more spring clamping units 10. Of the one or more spring clamping units 10, one is designated for the right spring and one for the left spring of a front or rear axle. Proximate the top of the spring clamping units 10 are spring clamp heads 11. In some embodiments of the present invention, the clamp head 11 is configured to clamp or hold a spring in an upper region of the spring. For example, the clamp head 11 can hold a spring at the second coil from the upper end of the spring. Here, the upper end of the spring is the end furthest in the positive Z direction and the spring end that is closer to the vehicle body. In various embodiments, spring clamping units 10 further comprise a Z-direction linear guide 5 that facilitates the movement of the spring clamping units 10 in the Z- or assembly direction.

In some embodiments, a clamping mechanism of the clamp head 11 is configured to clamp or hold the spring mechanically, electrically or manually. The clamp head 11 head may preferably be interchangeably connected to the spring clamping unit 10. For example, in some embodiments, the clamp head 11 is interchangeably connected to the spring clamping unit 10 by means of a mechanical coupling mechanism operable via a lever. The clamp head 11 may be interchanged to select the clamp head 11 capable of holding different spring variants and coil diameters of the suspension spring 50. In embodiments with two or more clamp heads 11, each clamp head 11 may be controlled individually to achieve a desired height of a plurality of suspension springs 50 and each may operate simultaneously or sequentially to achieve the desired heights. A more detailed description of spring clamping unit 10 is provided within description of FIG. 3 below.

Each of the spring clamping units 10 may have linear motion as a result of the engagement between the spring clamping unit 10 and linear rails, blocks, and bearings 25, attached to the upper surface of the frame 4 and may have vertical motion as a result of adjustment of linear rails, bearing, and blocks 29 which are aligned with the vertical or Z-direction and a secondary drive mechanism 28 to adjust the claim head 11 in a vertical or Z-direction. These linear and vertical movements may be used to adjust the position of the spring clamping unit 10 for use with a particular vehicle and/or assembly process (for example, to set up a line for a particular vehicle) and may be used in the course of each assembly cycle, as will be explained below in greater detail. The linear and vertical movements may be used to bring each spring clamping unit 10 into position and, after assembly has been completed, to disengage and remove each spring clamping unit 10.

In various embodiments, the spring compression tool 1 further comprises one or more control systems. For example, the spring compression tool 1 comprises one or more control systems that adjust the height of a suspension spring 50 in real-time fashion to achieve a level marriage of the first assembly and the second assembly in a desired spatial position. Referring to FIG. 1, one such control system is a primary drive unit 40. In various embodiments, the primary drive unit 40 comprises a primary controller 42 and a fixed motor 41. The primary drive unit 40 further comprises an X-direction linear guide 44, which is further described below. The primary controller 42 comprises one or more processors and one or more encoders (not shown). The primary controller 42 is configured to control the assembly of a front or rear suspension system of an automobile using the spring compression tool 1 for bringing a suspension spring 50 of a front or rear suspension system of an automobile or vehicle into a compressed state. In various embodiments, the primary drive unit 40 comprises multiple sub-drives that can independently or cooperatively control elements of the spring compression tool 1.

In various embodiments, for operating the spring compression tool 1, the primary drive unit 40 further comprises buttons 43. The buttons 43 can vary in utility, size, shape, number, and location on the spring compression tool 1. For example, one of buttons 43 can be used for starting the assembly of the front or rear suspension system including the compression of the suspension spring 50 by moving the moveable frame 30 upward. In an exemplary embodiment, the primary drive unit 40 comprises four buttons. The function of a first button of buttons 43 is to return the moveable frame 30 to its original home position, position 0. A second button of buttons 43 serves to manually jog the moveable frame 30 upward along the Z-direction, for example, to position 1. A third button of buttons 43 serves to manually jog the moveable frame 30 downward along the Z-direction. A fourth button of buttons 43 is used to indicate that the assembly is complete. The function(s) of the buttons 43 can vary greatly and is not limited by the above-mentioned example.

Referring to FIG. 2, provides a bottom, isometric view that illustrates the underside of the exemplary spring compression tool 1. From this angle, additional elements of the primary drive unit 40 and associated components of the spring compression tool 1 are visible. For example, a cardan shaft 13, a jacking box 14, a coupling 15, and a bevel gearbox 16 are connected in tandem underneath the frame 4 and lead to the fixed motor 41. In further example, in instances where manual override or recovery of the fixed motor 41 is required, a male socket 17, positioned under the frame 4, can be used. In a subsequent step, the male socket 17 may be manually connected to a manual drive and a recovery direct circuit (DC) tool (not shown). Additionally shown in FIG. 2 are lead screws 18 that facilitate connection of the spring compression tool 1 to a larger support structure within the vehicle assembly line.

During assembly, vehicle manufacturing requires precise spatial control of both the suspension system and the vehicle body. Referring again to FIG. 1, the X-direction linear guide 44 of the primary drive unit 40 may further enable precise movement of the suspension system, in various embodiments. The X-direction linear guide 44 is located above the fixed motor 41 and below the frame 4. The X-direction linear guide 44 makes it possible to position the frame 4 along the X-direction, which is transverse to the Z-axis assembly direction. In this way, the moveable frame 30 may also be moved in the X-direction via its connection to frame 4.

In exemplary embodiments, the spring compression tool 1 comprises a safety system that includes spatial verification feedback mechanisms. Accordingly, the spring compression tool 1 may further include components to position the vehicle body relative to the spring compression tool 1. For example, the spring compression tool 1 comprises X/Y body location pins 2. In particular, the X/Y body location pins 2 are configured to aid in horizontally positioning the body of the vehicle in the X and Y directions with respect to the spring compression tool 1. The X/Y body location pins 2 ensure that the suspension system is lifted towards the correct position with regard to the vehicle body, e.g. position 1, so that the suspension system can be precisely and reliably mounted to the vehicle body in the correct position. The X/Y body location pins 2 function when the body of the automobile, which is conveyed over the automobile assembly line, is lowered until bushes provided on the body come into contact with the X/Y body location pins 2, thereby horizontally and, if desired, additionally vertically positioning the body relative to the compression holding tool.

Additionally, in exemplary embodiments, the spring compression tool 1 further comprises a body Z-stop guides 3 which provide spatial feedback for the vehicle body along the Z-direction. The body Z-stop guides 3 prevents damage to the vehicle body and the spring compression tool 1 by ensuring that the body does not travel beyond the appropriate distance in the Z-direction. The X/Y body location pins 2 and the body Z-stop guides 3 may be adjustable with respect to their location on the moveable frame 30 and their height. The location and height of each X/Y body location pin 2 and body Z-stop guide 3 may be set in order to receive the body or assembly to be placed on the moveable frame 30. In embodiments, the X/Y body location pin 2 may be a spring loaded pin that is spring loaded in the Z-direction. In embodiments, the X-direction movement may be about ±5 mm.

Furthermore, the safety system of the spring compression tool 1 may further include components to position the suspension system relative to the spring compression tool 1. In various embodiments, the spring compression tool 1 comprises sub frame X/Y location pins 6. In particular, the sub frame X/Y location pins 6 are configured to aid in horizontally positioning the axle or suspension system of the vehicle in the X and Y directions with respect to the spring compression tool 1. In various embodiments, the spring compression tool 1 includes two sub frame X/Y location pins 6 that are located in the negative X-direction and negative Z-direction from the spring clamp heads 11. This allows a standard axle to be mounted such that the spring is in proximate alignment with the spring clamp heads 11.

Additionally within the safety system, in exemplary embodiments, the spring compression tool 1 comprises additional components for controlling the moveable frame 30. For example, the spring compression tool 1 comprises lower control arm Z pads 7. These pads are located proximate the spring clamping units 10 on either side of the moveable frame 30. Additionally, the spring compression tool 1 comprises maximum and minimum height sensors 8. The height sensors 8 ensure that the moveable frame 30 does not extend beyond set distances in the Z-direction.

In various embodiments, the spring compression tool 1 comprises additional tools used to aid in the assembly of a suspension system to a vehicle body. For example, various bars, screws, clamps, hooks, magnets, sensors, and the like are included on the spring compression tool 1 to aid in the spatial and relative positioning and securing of the vehicle body and the suspension system.

Figure 3:
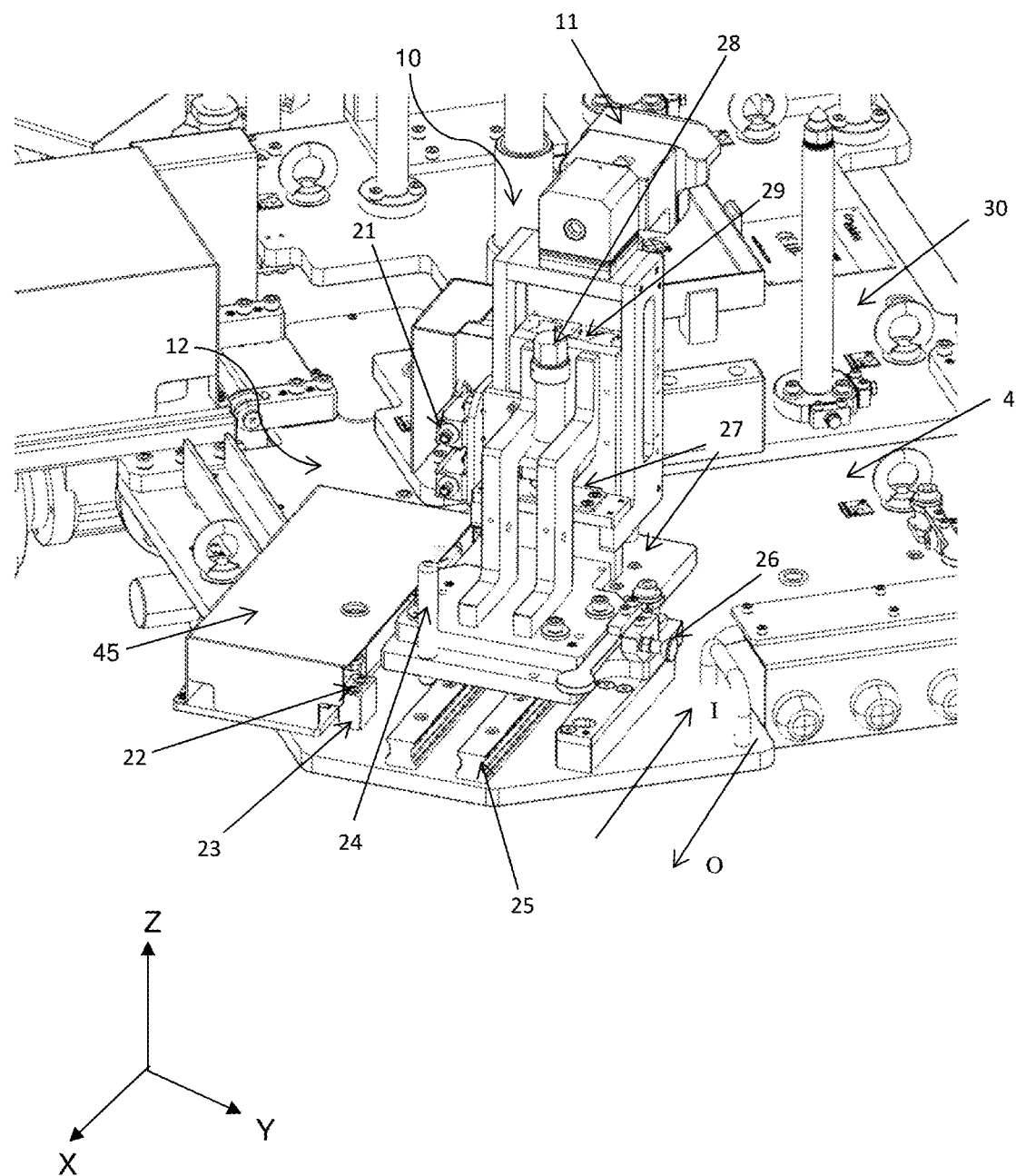
FIG. 3 is a top perspective view of an exemplary spring clamping unit of a spring compression tool in accordance with embodiments of the present disclosure.

FIG. 3 is a top isometric view of the exemplary spring clamping unit 10 of the spring compression tool 1 in accordance with embodiments of the present disclosure. A feature of the spring clamping unit 10 is an interchangeable clamp head 11. In various embodiments, the spring clamping unit 10 comprises a plurality of clamps types, styles, and sizes. Various forms of the interchangeable clamp head 11 can thus accommodate various vehicle models, products, and design modifications without requiring the manufacture of an entirely new spring compression tool.

FIG. 3 shows just one spring clamping unit 10 in order to facilitate explanation. However, in some embodiments, the spring compression tool 1 may feature two or more clamping units 10, for example, a first clamping unit and a second clamping unit, as shown in, for example, FIG. 1. In other embodiments, four or more claiming units 10 may be included on the spring compression tool 1 to install up to four suspension springs 50 simultaneously or near simultaneously.

FIG. 3 also illustrates additional control systems within the spring compression tool 1, such as compression sub-assembly 12. The compression sub-assembly 12 controls various aspects of the operation of the spring clamping unit 10. For example, the compression sub-assembly 12 controls the opening and closing of the clamp head 11 to secure or release a suspension spring 50. In certain embodiments, the compression sub-assembly 12 controls the spatial position of the clamp head 11. For example, the compression sub-assembly 12 moves the position of the top of the suspension spring 50 from a parked, starting position, ("position 0"), to a car line position relative the vehicle body, ("position 1").

In exemplary embodiments, the compression sub-assembly 12 comprises controllers, guides, and sensors to provide precise control of the spring clamping unit 10 and the clamp head 11. As shown in FIG. 3, the spring clamping unit 10 further comprises linear rails, bearing, and blocks 29 which are aligned with the Z-direction. In other words, the linear rails, bearing, and blocks 29 allow for the linear adjustment of the clamp head 11 in the up-and-down direction. During the manufacturing process, the spring head 11 clamps onto the suspension spring 50. Then, a secondary drive mechanism 28 of the compression sub-assembly 12 facilitates vertical, Z-direction movement of the clamp head 11.

Depending on assembly space and customer preference, the secondary drive mechanism 28 may come in various embodiments. For example, in some embodiments, the secondary drive mechanism 28 is a DC tool drive-controlled to achieve a preset torque setting between the clamp head 11 and the suspension spring 50. In various embodiments, where component clearance allows, the secondary drive mechanism 28 is an electric motor permanently mounted on the spring compression tool 1 that facilitates the vertical, Z-direction movement of the clamp head 11. The secondary drive mechanism 28 may include a lead screw and may also incorporate a gas strut 27.

In various embodiments, the compression sub-assembly 12 comprises a secondary controller 45. The secondary controller 45 comprises one or more processors and encoders. In exemplary embodiments, the secondary controller 45 is positioned at the base (lowest Z-direction location), of the spring clamping unit 10. In further example, in various embodiments, the compression sub-assembly 12 comprises minimum and maximum height sensors 21.

In various embodiments, the spring compression tool 1 comprises at least three independent drives. For example, each drive controls a different aspect or element of vehicle production. In certain embodiments, the drives of the spring compression tool 1 can automate the compression of front and rear springs. In some embodiments, the independent drives adjust spring compression and special position of various elements of the suspension system. Such compression may be adjusted such that different springs are compressed to the same degree or to different degrees. In various embodiments, the drives are programmed so that the suspension system achieves car line position, (position "1") with the vehicle body. The drives provide enhanced customization so that a single tool can accommodate various vehicle makes, models, and geometries.

In an exemplary embodiment, to align the clamp hear 11 most favorably toward the suspension spring 50, the spring clamping unit 10 is positioned at an angle relative to the edges of the frame 4. Components of the spring clamping unit 10 move linearly relative to the spring clamping unit but at angles different from the XYZ directions found in FIG. 1. Therefore, to clarify the movement of components relative to the spring clamping unit 10, certain mechanisms are labeled as relating to either the inboard or outboard direction of the spring clamping unit 10. As shown on FIG. 3, Arrow I indicates the approximate inboard direction and Arrow O indicates the approximate outboard direction of the spring clamping unit 10.

As illustrated in FIG. 3, the spring clamping unit 10 is affixed to the upper surface of the linear rails, blocks, and bearings 25, which may alternatively be described as a linear rail system. In turn, the linear rails, blocks, and bearings 25 are affixed to the upper surface of the frame 4. In various embodiments, the spring clamping unit 10 can move in inboard or outboard directions along the linear rails, blocks, and bearings 25. In various embodiments, the compression sub-assembly 12 comprises sensors that determine the movement of various components of the spring clamping unit 10. For example, the compression sub-assembly 12 comprises inboard and outboard position sensors 22 and inboard and outboard travel stops 23.

In some embodiments, the spring clamping unit 10 further comprises a handle 24 to aid in the inboard and outboard movement of the spring clamping unit. The spring clamping unit 10 also includes an inboard and outboard plunger 26. To enhance safety and efficacy of the spring compression tool 1, the plunger 26 includes a lockoff safety feature that stops the movement of the spring clamping unit 10 and prevents hazardous or dangerous movement of the spring clamping unit 10. In various embodiments, the spring clamping unit 10 comprises a gas strut 27 to ensure proper positioning of the spring clamping unit 10. Specifically, the gas strut 27 ensures that the sliding spring clamping unit is always pushed up against the height adjustment setting lead screw 18.

Figure 4:
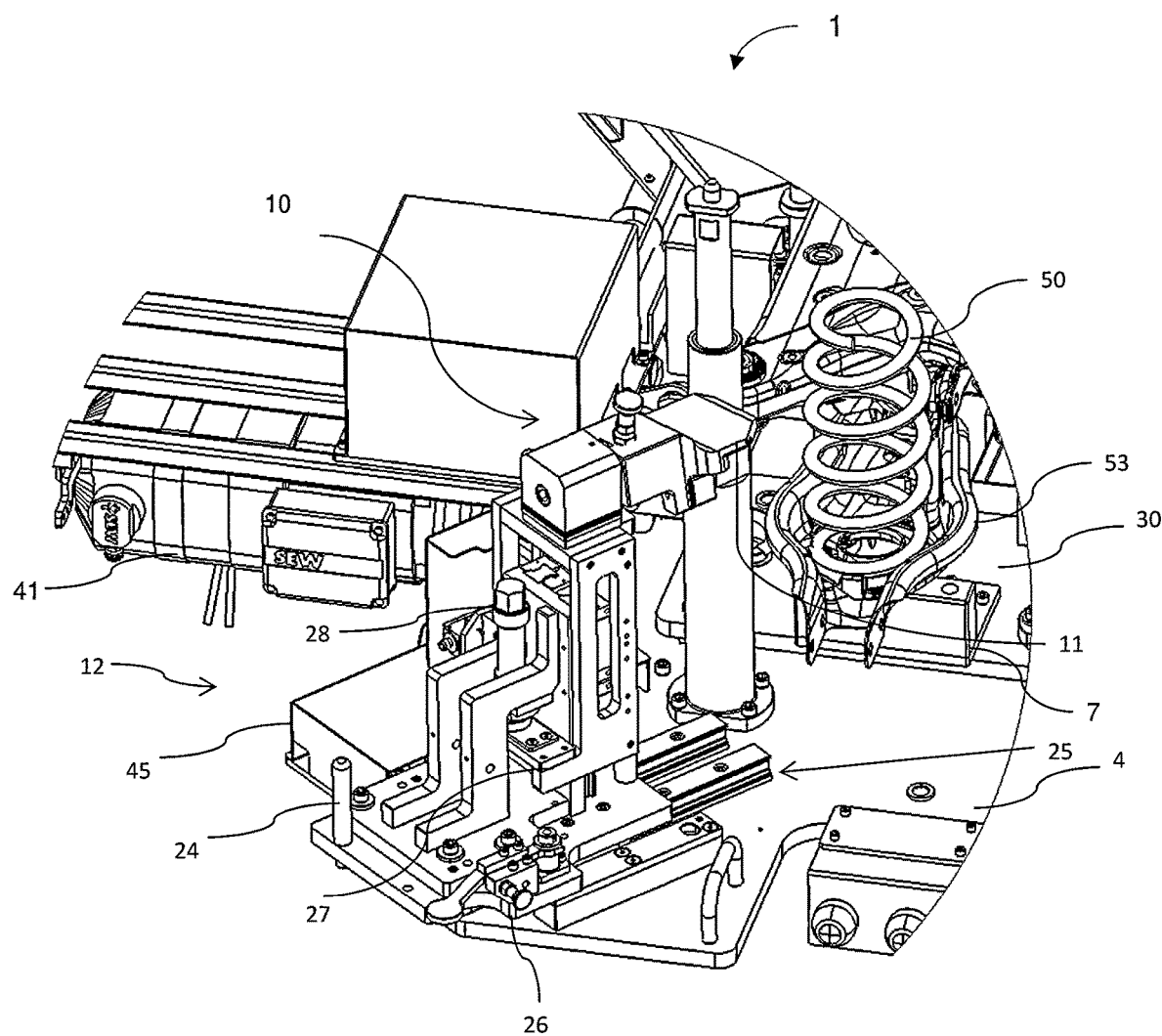
FIG. 4 is a top perspective view of a portion of an exemplary spring compression tool including one spring clamping unit during a stage in a process of operating the spring compression tool.
Figure 5:
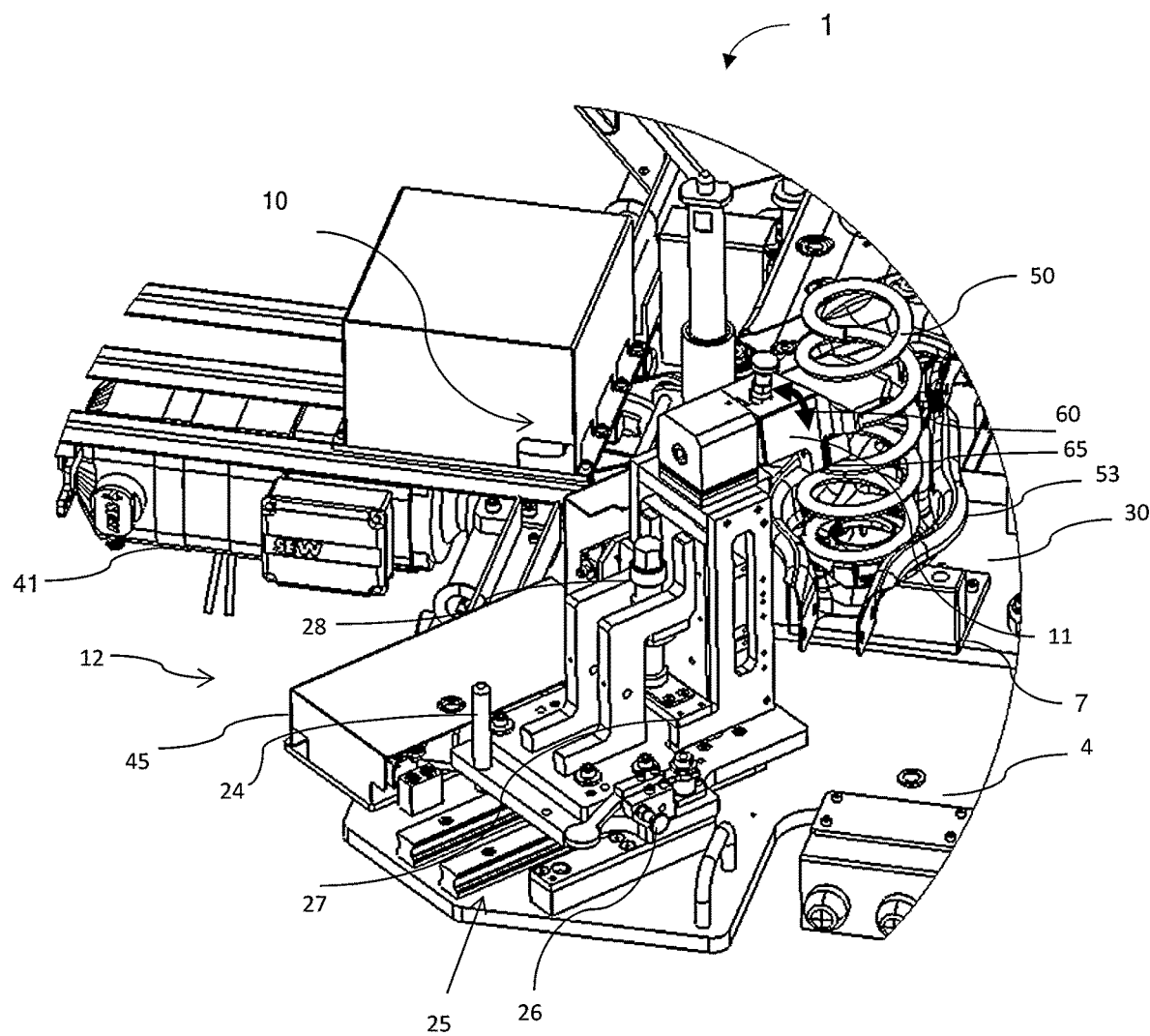
FIG. 5 is a top perspective view of a portion of an exemplary spring compression tool including one spring clamping unit during another stage in a process of operating the spring compression tool.
Figure 6:
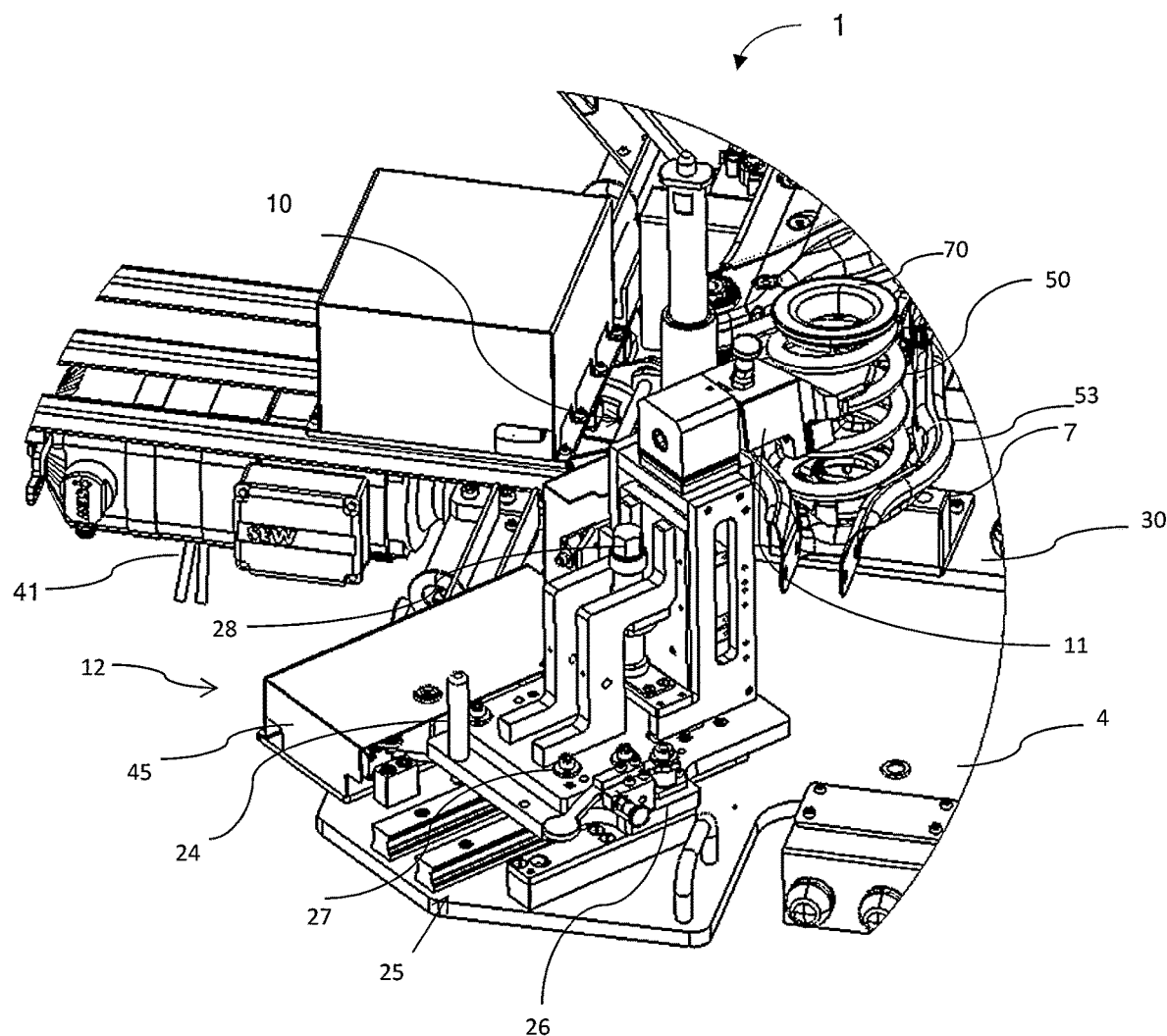
FIG. 6 is a top perspective view of a portion of an exemplary spring compression tool including one spring clamping unit during another stage in a process of operating the spring compression tool.

FIGS. 4-6 illustrate stages in a process of using the spring compression tool 1 to compress and mount the suspension spring 50 as a vehicle sub frame (including the suspension spring 50 and the lower control arm 53) are attached to a vehicle body during the assembly of the vehicle according to various embodiments.

FIG. 4 illustrates a portion of the spring compression tool 1 including the compression sub-assembly 12 and the spring clamping unit 10. The suspension spring 50 is seated in the lower control arm 53 and the lower control arm 53 is positioned on the lower control arm Z pad 7 of the moveable frame 30. The moveable frame 30 is in a lower position. The fixed motor 41 controls the height of the moveable frame 30 using an encoder. The compression sub-assembly 12 is in an outboard and locked position with respect to the linear rails, blocks, and bearings 25 and the spring clamping unit 10 is not engaged with the suspension spring 50. The inboard and outboard position sensors 22 within the secondary controller 45 may be used to determine the position of the compression sub-assembly 12 and the spring clamping unit 10. The height of the clamp head 11 is adjusted as needed by the secondary drive mechanism 28 to allow the clamp head 11 to adjust to a height that is between the heights of coils of the suspension spring 50, such that the clamp head 11 is in an open position. The heights of coils of the suspension spring 50 may vary depending on the characteristics of the suspension spring 50 and how suspension spring 50 is positioned with respect to the lower control arm 53.

FIG. 5 illustrates a subsequent stage in which the compression sub-assembly 12 and the spring clamping unit 10 are transitioned to an inboard and locked position with respect to the linear rails, blocks, and bearings 25. The moveable frame 30 remains in the lower position. The secondary drive mechanism 28 adjusts the clamp head 11 so that the clamp head 11 moves into a closed position in which the clamp head 11 lightly touches the suspension spring 50. The clamp head 11 may engage with a coil of the suspension spring 50 which may be near to top of the spring. For example, FIG. 5 shows an embodiment in which the clamp head 11 engages with a third coil of suspension spring 50, counting from the end of the compression spring 50 opposite the lower control arm 53. In other embodiments, the clamp head 11 may engage with a coil of the suspension spring 50 nearer the middle of even below the middle of the suspension spring 50. The clamp head 11 may be lowered onto the suspension spring 50 until a pre-set torque for the pressure of the clamp head 11 against the suspension spring 50 is reached. The champ head 11 may have a degree of rotational freedom indicated by an arrow 60 to improve the fit of the clamp head 11 to the angle or helix of the portion of the coil of the suspension spring 50 engaged by the clamp head 11. After the clamp head 11 is lowered onto the suspension spring 50, the suspension spring 50 may be checked to confirm that a portion of the suspension spring 50 is seated in a groove 65 on the underside of the clamp head 11 to secure the suspension spring 50.

FIG. 6 illustrates a subsequent stage in which the fixed motor 41 drives the jacking boxes 14 mounted underneath the frame 4 to move the moveable frame 30 to a raised position. As the moveable frame 30 is raised, components on the moveable frame 30 are lifted, including the lower control arm 53 positioned on the lower control arm Z pad 7 of the moveable frame 30. As the moveable frame 30 is raised, the spring 30 is compressed against the clamp head 11 and against a portion of a strut mount 70, bringing the sub frame assembly into contact with the body of the vehicle being assembled. The sub frame may then be bolted or otherwise connected to the body. For example, in embodiments, sub frame bolts and damper bolts may be applied.

After the sub frame and damper are fitted to the body, the clamp head 11 is disengaged from the suspension spring 50 by moving the compression sub-assembly 12 in an outboard position along the linear rails, blocks, and bearings 25. The moveable frame 30 is lowered and the spring compression tool 1 returned to the position depicted in FIG. 4 to initiate another cycle of operation.

Figure 7:
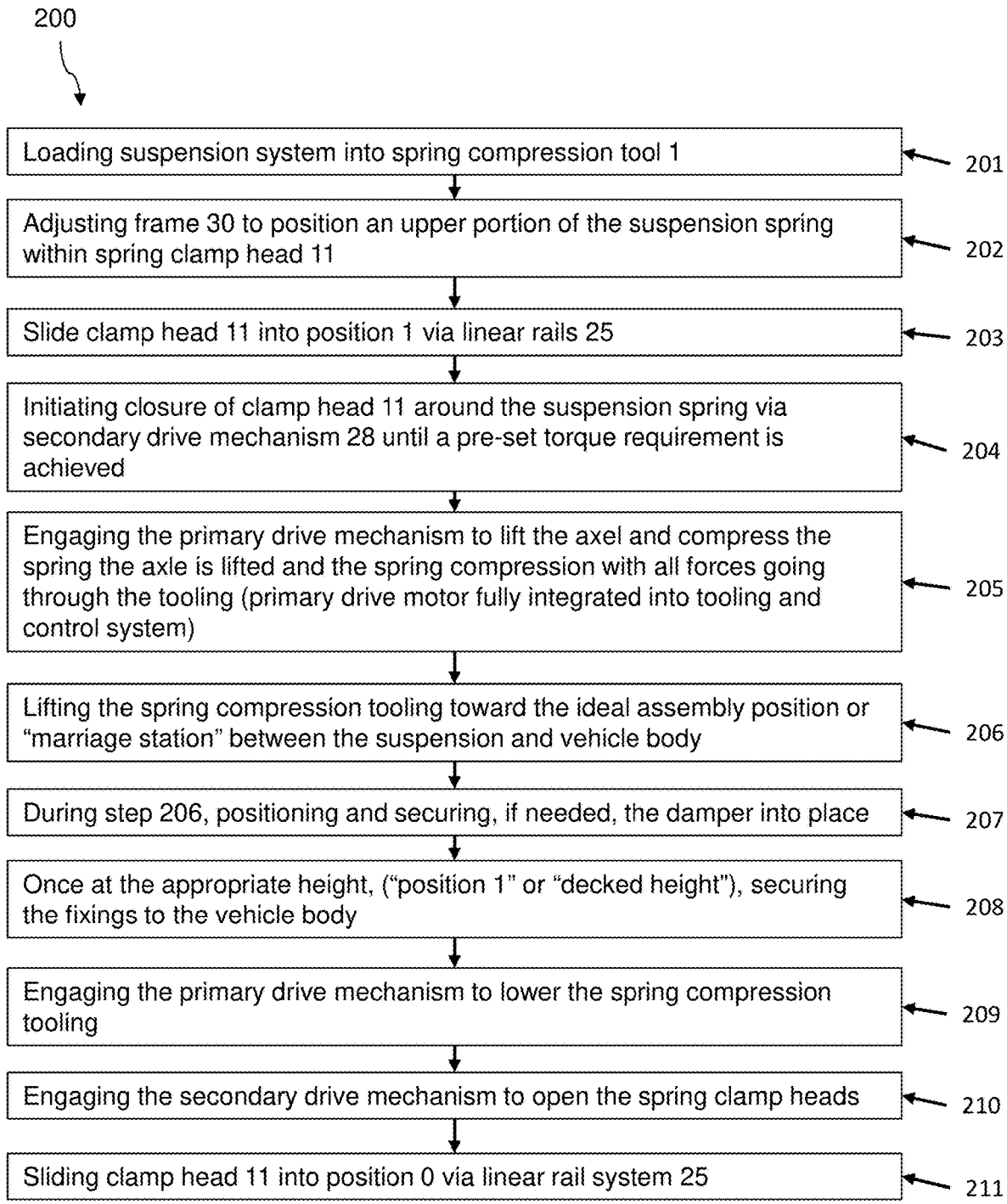
FIG. 7 is an exemplary manufacturing procedure in accordance with embodiments of the present disclosure.

A general outline of the improved manufacturing using spring compression tool 1 is provided in FIG. 7.

In exemplary embodiments, FIG. 7 provides an improved vehicle manufacturing procedure 200 in accordance with embodiments of the present disclosure. The improved vehicle manufacturing procedure 200 comprises multiple steps. In various embodiments, a step 201 involves loading the suspension system into the spring compression tool 1. A step 202 involves adjusting the moveable frame 30 as to position an upper portion of the suspension spring 50 within the clamp head 11. The suspension spring 50 may be loaded into the lower control arm 53 by a line side operative using location features within the lower control arm 53 and/or the suspension spring 50. A step 203 comprises sliding the clamp head 11 via the linear rails, blocks, and bearings 25 (which may alternatively be described as a linear rail system) from a starting, parked position, ("position 0") into a car line position relative the vehicle body ("position 1"). In various embodiments, position 1 is a height or position in space programmed specifically for each make and model of vehicle assembled in the assembly line.

In various embodiments, a step 204 includes initiating the closure of clamp head 11 around the suspension spring 50 via the secondary drive mechanism 28 until a pre-set torque requirement for the pressure of the clamp head 11 against the suspension spring 50 is achieved. In an exemplary embodiment, the secondary drive mechanism 28 adjusts the height of the clamp head 11 to position the top of the suspension spring 50 into a car line position by compressing the suspension spring 50 to the extent necessary to achieve the desire height. In various embodiments, sliding the clamp head 11 into position 1 results in the partial compression of the suspension spring or springs.

A step 205 of the improved vehicle manufacturing procedure 200 comprises engaging the primary drive unit 40 to lift the axle of the suspension system, thus compressing the suspension spring. The step 205 is performed such that almost all of the forces that result from the spring compression pass through the spring compression tool 1 and not the vehicle body. A step 206 comprises lifting the spring compression tool 1 toward the ideal assembly position, ("marriage station" or "position 1") between the suspension and vehicle body. As the spring compression tool 1 increases in height during the step 206 reaching position 1, a step 207 follows comprising positioning and, if needed, securing a damper into place. The damper may be installed to control opening of the lower control arm 53 so that the lower control arm 53 does not open too far. Once at the appropriate height, ("position 1" or "decked height"), a step 208 follows, comprising securing fixings to secure the axle to the vehicle body.

A step 209 of the method comprises engaging the primary drive unit 40 to lower the spring compression tool 1. This step lowers the axle and released the suspension spring pressure generated at the steps 205-208. To prevent the car from following the axle, during the step 209, the vehicle body will rest on static supports. Once the main axle support is lowered, a step 210 follows. The step 210 comprises engaging the secondary drive mechanism 28 to open the spring clamp heads 11. This step disengages the spring clamp heads 11 from the suspension clamp, freeing the spring clamp heads to be positioned in the parked position ("position 0"). Next, a step 211 comprises sliding the clamp heads 11 into position 0 via the linear rails, blocks, and bearings 25. In various embodiments, position 0 is programmed individually and may be unique for each make and model of vehicle assembled in the assembly line.

In various embodiments of the present disclosure, the order of the steps 201-211 of the improved vehicle manufacturing procedure 200 may differ to accommodate different vehicle components and assembly procedures. For example, some actions such as securing the damper or fixings may result in small movements of the suspension system relative the vehicle body. In such occasions, certain positioning steps, such as the step 203 and the step 205, may be repeated to ensure proper positioning of vehicle components. Further, different component geometries, suspension system configurations, and vehicle bodies may require rearrangement of steps. Further, the spring compression tool 1 can be used to compress items other than springs. For example, some suspension systems may include different strut configurations or hydraulic lifts that additionally need to be compressed and affixed to the vehicle.

FIG. 8A-8C illustrate use of an example spring compression tool 1 to place a vehicle sub frame 75 in car line position with respect to vehicle body 80. Only a portion of the spring compression tool 1 featuring a single spring clamping unit 10 is shown. The suspension spring 50 of the sub frame 75 is held by the clamp head 11 and is positioned in the lower control arm 53 of the sub frame 75 and the lower control arm 53 is positioned on the lower control arm Z pad 7 of the moveable frame 30. The vehicle sub frame 75 is supported on the moveable frame 30. The moveable frame 30 has been moved vertically into an elevated position with respect to the frame 4, lifting the sub frame 75 into car line position. The suspension spring 50 is seated against the strut mount 70 of the vehicle body 80. The spring compression tool 1 has achieved a level marriage such that the vehicle sub frame 75 and vehicle body 80 are in a desired spatial position and may be attached, e.g., bolted together, to complete this portion of the assembly process.

While exemplary embodiments of the devices and methods have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A spring compression tool used to marry a first assembly to a second assembly via a spring, the spring compression tool comprising:
    a frame defining an X/Y plane;
    a spring clamping unit movably attached to the frame, the spring clamping unit having a clamp with a clamp head, the clamp head movable in a Z-direction relative to the frame;

a moveable frame moveably connected to the frame, the moveable frame movable in the Z-direction relative to the frame;

one or more supports mounted on the moveable frame and configured to hold the first assembly; and one or more control systems operable to compress a spring held in the clamp head and move the clamp head in the Z-direction to adjust a height of the spring held within the spring clamping unit in real-time fashion to achieve a desired spring height during marriage of the first assembly to the second assembly.

2. The spring compression tool according to claim 1, wherein the one or more control systems achieve a level marriage of the first assembly and the second assembly in a desired spatial position in real-time.

3. The spring compression tool according to claim 1, wherein the moveable frame is further moveable in the X/Y plane relative to the frame.

4. The spring compression tool according to claim 1, wherein the spring clamping unit is moveable and mounted to the frame via a linear rail of the frame.

5. The spring compression tool according to claim 1, wherein the moveable frame additionally comprising a plurality of adjustable location pins mounted to a surface of the moveable frame.

6. The spring compression tool according to claim 1, wherein the one or more control systems further comprises a drive motor, one or more processors, and one or more encoders.

7. The spring compression tool according to claim 1, wherein the one or more control systems comprises a primary drive unit controlling movement of the moveable frame in the Z-direction relative to the frame.

8. The spring compression tool according to claim 1, wherein the spring clamping unit comprises a plurality of clamps.

9. The spring compression tool according to claim 1, wherein the one or more control systems comprises a drive mechanism controlling a spatial position of the clamp head in the X/Y plane and the Z-direction relative to the frame.

10. The spring compression tool according to claim 9, wherein the drive mechanism manipulates the clamp head into an open or closed position.

11. The spring compression tool according to claim 9, wherein the drive mechanism secures the clamp head to an upper region of a spring.

12. The spring compression tool according to claim 1, wherein the supports are adjustable in vertical and horizontal directions to adjust a spatial position of an upper region of the spring and to compress the spring.

13. The spring compression tool according to claim 1, further comprising a safety system having a safety switch and a spatial verification system for verifying a spatial position of the clamp head and a spatial position of the spring.

14. The spring compression tool according to claim 1, wherein the clamp head is an interchangeable clamp head that can accommodate different spring varieties and sizes.

15. The spring compression tool according to claim 1, wherein the spring clamping unit additionally comprises a first set of linear rails and blocks attached to the frame and supporting the spring clamping unit, the first set of linear rails and blocks configured to permit adjustment of a position of the spring clamping unit in the X/Y plane on the frame.

16. The spring compression tool according to claim 1, wherein the spring clamping unit additionally comprises a second set of linear rails and blocks allowing adjustment of a height of the clamp head and a height of the clamp.

17. The spring compression tool according to claim 1, wherein the first assembly is a suspension system and the second assembly is a portion of a vehicle body.

18. The spring compression tool according to claim 1, wherein the one or more supports are adjustable to conform to the first assembly.

\* \* \* \* \*